L. KIRSCHBRAUN.
WATERPROOF BOARD AND PROCESS OF MAKING SAME.
APPLICATION FILED MAY 28, 1920.

1,417,836. Patented May 30, 1922.

Inventor,
Lester Kirschbraun.

UNITED STATES PATENT OFFICE.

LESTER KIRSCHBRAUN, OF CHICAGO, ILLINOIS.

WATERPROOF BOARD AND PROCESS OF MAKING SAME.

1,417,836.   Specification of Letters Patent.   Patented May 30, 1922.

Application filed May 28, 1920. Serial No. 384,902.

*To all whom it may concern:*

Be it known that I, LESTER KIRSCHBRAUN, a citizen of the United States, residing in the city of Chicago, county of Cook, and State of Illinois, have invented certain new and useful Improvements in Waterproof Boards and Processes of Making Same, of which the following is a specification.

Among the salient objects of this invention are to produce a product having an inherent structural stiffness and which consists essentially of a rigid cement filler imbedded between two or more plies of grit surfaced prepared roofing.

The roofing plies 1 may be made in the usual manner and the grit surfacing on the roofing sheet or waterproofing element may be relatively cheap. For example, gravel, limestone, quartz, brick or any stiff comminuted particles 2 may be used for the facing. These particles are, of course, partially imbedded in the coating 3 of the waterproofing sheet in the usual manner.

Figure 1:
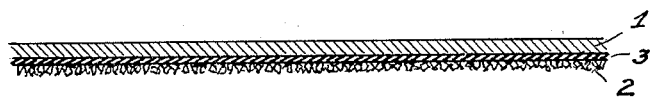
Fig. 1 is an edge view of the two plies in position to be united.
Figure 2:
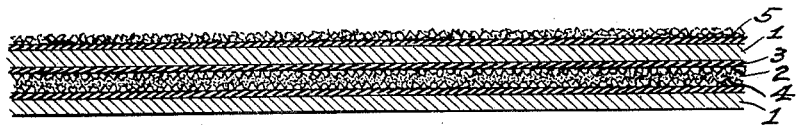
Fig. 2 is an edge view of the combined plies with a granular surface imposed thereon.

Over the comminuted surface of one of these plies is spread a plastic mortar 4 composed of a rigid cementitious material, as for example, Portland cement or magnesite cement, the latter being preferable for the reason that it has a little flexibility. The two plies are then pressed together as shown in Fig. 2 so that the mortar flows into the interstices of the comminuted particles, so as to firmly engage and cement the plies as the mortar sets. The inherent strength and stiffness of this mortar filler permits of the use of relatively thin fabric plies.

One of the exposed outer surfaces of this sheet can have applied to it a granular facing 5 of an attractive color such as red or green stone, which facing can be applied either before or after the plies are reunited together.

Figure 3:
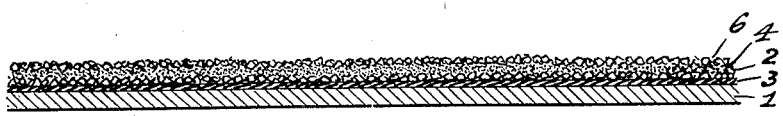
Fig. 3 is an edge view of a single ply having the reinforcement applied to its surface and a vari-colored grit surfacing imposed on the reinforcement.

If it is desired to make a single ply wall board, the mortar 4 is applied to the grit covered surface of a single saturated and coated fabric sheet as shown in Fig. 3 in the manner heretofore described and then before the mortar sets, there is projected into its exposed surface vari-colored grits 6 either in mottled display or designs such for example as in dashes and stuccos.

Where the rigid mortar forms the exposed surface it is preferable to have a magnesium oxychloride cement mortar as this can be colored. In this manner may be made a preformed wall board which may be from $\frac{1}{4}$" to $\frac{1}{2}$" thick.

The product lends itself particularly to the production of a roofing element of a tile-like character which may be laid to closely resemble a tiled surface and besides having to a considerable degree the weathering and wearing qualities of tile, it may also be formed in the attractive and ornamental designs of the tile covering. In addition this product may be utilized in a variety of different arts where a rigid non-conducting substance is adaptable.

I claim as my invention:

1. A wall board composition consisting of a plurality of relatively thin saturated felted fibrous plies, the opposed surfaces thereof being adhesively united with a rigid cementitious substance and comminuted reinforcing particles coating said plies, a coating and granular facing on an exposed surface of said composition.

2. A waterproof composition consisting of a plurality of saturated felted fibrous plies, the opposed surfaces thereof being adhesively united by a rigid cementitious substance, and comminuted reinforcing particles imbedded between said plies.

3. A process of making wall board composition having rigid structural stiffness consisting in adhesively uniting by means of a rigid cementitious substance two relatively thin bitumen saturated felted fibrous sheets containing imbedded comminuted reinforcing particles between the opposed faces of said plies.

4. A process of making a waterproof composition consisting in forming a plurality of bituminous saturated felted fibrous plies adhesively applying comminuted reinforcing particles to one face of each ply, uniting the face of the plies to which said comminuted particles are imbedded by means of a bituminous binder and forcing the plies together by means of rigid cementitious substance so that the angular projections of the comminuted particles of one ply will enter the interstices between the comminuted particles of the other ply, thus producing a product having inherent structural stiffness.

5. A waterproof board composition formed of fibrous sheets, a rigid cementitious substance and comminuted particles so disposed to each other to reinforce the composition, to permit it retaining a molded form.

LESTER KIRSCHBRAUN.